Dec. 17, 1968   J. W. HAUSER   3,416,430
SIDE LOADING TOASTER
Filed March 20, 1967

INVENTOR.
Jon W. Hauser
BY
Charles H. Redman
Atty.

United States Patent Office 3,416,430
Patented Dec. 17, 1968

3,416,430
SIDE LOADING TOASTER
Jon W. Hauser, St. Charles, Ill., assignor of six percent to Charles H. Redman and four percent to Richard D. Shearer, both of St. Charles, Ill.
Filed Mar. 20, 1967, Ser. No. 624,573
9 Claims. (Cl. 99—332)

ABSTRACT OF THE DISCLOSURE

A toaster having a housing with lateral openings to receive articles to be toasted, which articles are carried in a frame on a cover and are movable through the openings into the housing when the cover is closed. Automatic switch means is provided to start and stop operation.

---

The invention pertains to a side loading toaster apparatus and is particularly concerned with the construction and assembly of such a toaster which comprises a sheet material housing having a multitude of slots in one of its side faces, each to receive an article to be toasted. The articles are initially placed in a frame carried on the inside face of a cover associated with said face and movable from an open, loading position, into a position overlying the slots so as to thrust the articles through the slots and into the interior of the housing. The housing contains electric heating elements. An on-off switch is arranged to be closed when the cover is moved into closed position and a heat-controlled timer switch operates to limit the on period.

It is, therefore, an object of the invention to provide a toaster of the character referred to.

Another object is to provide a housing containing heating elements with a novel opening arrangement in a side wall to receive articles to be toasted.

Another object is to provide a toaster housing with a closure having article holding frames on its inside face.

Figure 1:
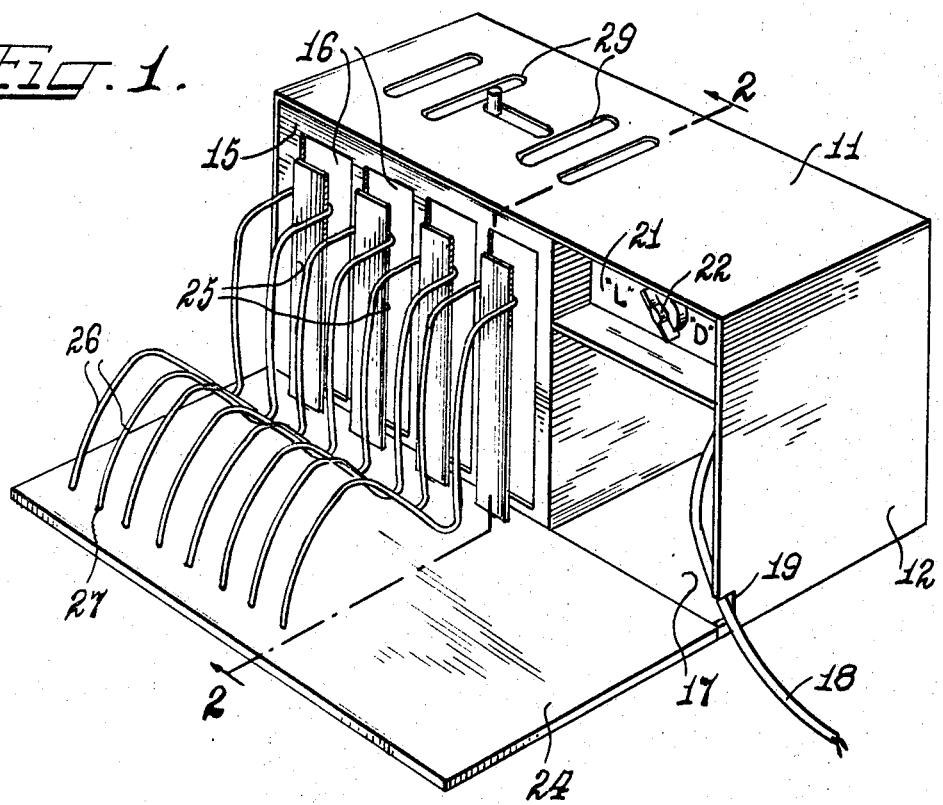
Figure 2:
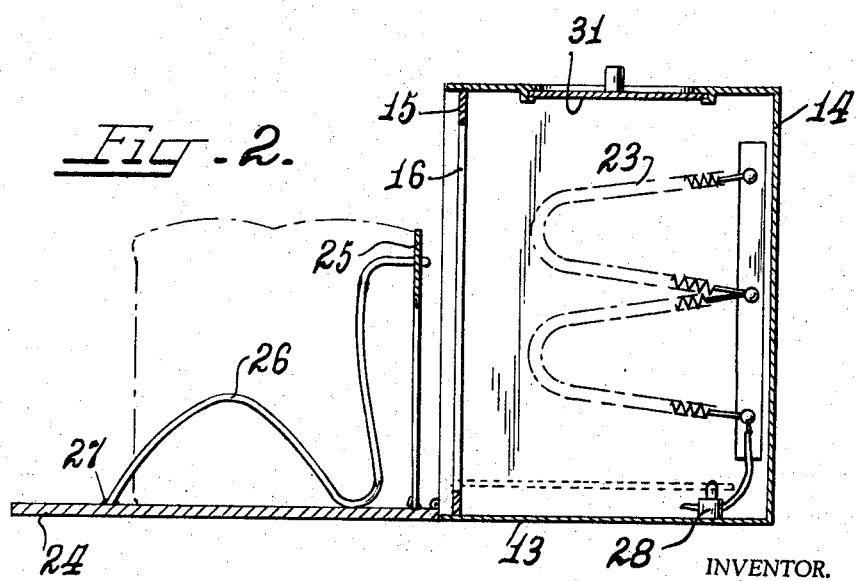

The structure by means of which the above noted and other advantages and objects of the invention are attained will be described in the following specification, taken in conjunction with the accompanying drawings, showing a preferred illustrative embodiment of the invention, in which:

FIG. 1 is a perspective view of the toaster, showing its cover in open position; and FIG. 2 is a vertical transverse sectional view taken substantially on line 2—2 of FIG. 1.

Referring to the exemplary disclosure of the subject invention as shown in the accompanying drawings, the toaster comprises a rectangular housing, fabricated from sheet metal, having a top wall 11, end walls 12, a bottom wall 13 and a back wall 14. The housing is partially closed on its front face by a thin metal sheet 15 having longitudinally spaced vertical slots 16 therein, each of a width to receive freely therethrough, for example, a slice of bread. This sheet 15 terminates short of one end of the housing to leave a clear space 17 to receive an electric cord 18 stored therein when the toaster is not in use. A notch 19 in one end wall 12 permits said cord to be extended to the outside of the housing when the toaster is in use. If desired, there may be substituted for the notch 19 an opening in the bottom wall 13 through which the cord could extend.

Also arranged above the clear space 17 is a recessed panel 21 mounting a heat controlled timer switch 22. Mounted inwardly of the sheet 15 are a plurality of electric heater elements 23 one preferably arranged on each side of each of the slots 16.

A cover 24 is hingedly mounted along its lower edge to the front edge of the housing bottom wall 13. This cover is of such size and shape that when in closed position it overlies the entire open front face of the housing. The cover 24 mounts on its inside face a plurality of equally spaced apart rigid strips 25 of sheet material and each strip has connected to it a pair of sinuous wire frames 26 that are anchored at their forward ends, as at 27, to the cover. These strips and frames are of a combined width and length to be passed freely through the related slots 16 when the cover is moved into a closed position.

In use, a slice of bread, for example, is placed between adjacent frames 26 in abutment with a related strip 25 while the cover is in open position. Upon closing the cover, the slice of bread is carried through the related slot 16 into the interior of the housing so as to be acted upon by the heating elements 23.

These heating elements are energized, only when the cover is carried into its closed position, by means of a normally open pressure switch 28 arranged in the housing for engagement by one of the strips 25 when the cover is in closed position, as shown in dotted lines in FIG. 2. At or prior to closing the cover, the heat controlled timer switch 22 is set at L (light toast) or D (dark toast) to control the duration of operation of the heating elements. The electric wiring between the heater elements, the time switch, the on-off switch and the electric cord 18 is conventional and is not specifically disclosed.

The housing top wall 11 is formed with a series of apertures 29 which may be closed, opened or partially closed, by a manually adjustable slotted slide plate 31. Control of the degree of opening of the apertures affords means to regulate the amount of moisture that may escape from the article during the toasting process.

Although I have described a preferred embodiment of my invention, in considerable detail, it will be understood that the description thereof is intended to be illustrative rather than restrictive, as details of the strucure may be modified or changed without departing from the spirit or scope of the invention. Accordingly, I do not desire to be restricted to the exact construction described.

I claim:

1. A toaster comprising a substantially rectangular housing open on its front face, a sheet of material closing a part of said face, said sheet having a plurality of longitudinally spaced vertical slots therein, a cover for said face, a plurality of article carriers on the inside surface of said cover one in alignment with each slot, a plurality of electric heating elements in said housing, and a cord storage chamber provided in that part of said housing not covered by said sheet of material.

2. The toaster recited in claim 1, in which the article carrier are longitudinally spaced apart.

3. The toaster recited in claim 1, in which the article carriers each comprises a frame disposed normal to the plane of the cover.

4. The toaster recited in claim 1, in which the article carriers each comprise a strip and spaced apart frame members disposed between and normal to the planes of the strip and cover.

5. The toaster recited in claim 1, in which a normally open control switch for the heating elements is arranged in the housing for engagement by an article carrier when the cover is in closed position.

6. The toaster recited in claim 1, in which the housing mounts a heat controlled timer switch.

7. The toaster recited in claim 6, in which the heat controlled timer switch is located in that part of the housing not covered by the sheet of material.

8. The toaster recited in claim 1, in which the housing has apertures in its top wall and means is provided to regulate the degree of opening of said apertures.

9. The toaster recited in claim 1, in which the article carriers each comprise a strip and associated frames disposed normal to the plane of the cover and a normally open control switch for the heating elements is arranged to be closed when the cover is in closed position.

References Cited

UNITED STATES PATENTS

| | | |
|---|---|---|
| 1,051,503 | 1/1913 | Klein. |
| 1,108,554 | 8/1914 | Copeman _____ 99—391 |
| 1,550,949 | 8/1925 | Coleman _____ 99—391 XR |
| 1,901,603 | 3/1933 | Juengst et al. _____ 99—391 XR |
| 1,987,703 | 1/1935 | O'Neill _____ 99—391 XR |
| 2,042,226 | 5/1936 | Harpster _____ 99—391 XR |
| 2,129,360 | 9/1938 | Purpura _____ 99—391 XR |
| 2,147,457 | 2/1939 | Rahr _____ 99—391 |
| 2,693,141 | 11/1954 | Johnson et al. _____ 99—391 XR |
| 2,918,860 | 12/1959 | Matzennauer _____ 99—337 XR |

BILLY J. WILHITE, *Primary Examiner.*

U.S. Cl. X.R.

99—337, 391, 401